United States Patent

Weiss et al.

Patent Number: 5,532,195
Date of Patent: Jul. 2, 1996

[54] DOPED QUARTZ GLASS, AND ENCLOSURES FOR ELECTRICAL APPARATUS MADE THEREFOR

[75] Inventors: Werner Weiss, Stadtbergen, Germany; Gerhard Wagner, Brig, Switzerland

[73] Assignee: Patent-Treuhand-Gesellschaft fuer Elektrische Gluehlampen mbh, Munich, Germany

[21] Appl. No.: 345,005

[22] Filed: Nov. 23, 1994

Related U.S. Application Data

[63] Continuation of Ser. No. 148,822, Nov. 4, 1993, abandoned.

[30] Foreign Application Priority Data

Dec. 7, 1992 [DE] Germany .................. 42 41 152.1

[51] Int. Cl.⁶ .................................................. C03C 3/06
[52] U.S. Cl. ............................................................ 501/54
[58] Field of Search ............................................. 501/54

[56] References Cited

U.S. PATENT DOCUMENTS

| | | | |
|---|---|---|---|
| 2,255,558 | 9/1941 | Dalton | 501/54 |
| 3,113,855 | 12/1963 | Elmer | 65/31 |
| 3,472,667 | 10/1969 | Wagstaff | 501/54 |
| 3,923,533 | 12/1975 | Hammel et al. | 501/54 X |
| 4,336,048 | 6/1982 | van der Steen et al. | 501/54 X |
| 4,508,991 | 4/1985 | Wurster et al. | 313/579 |
| 4,605,632 | 8/1986 | Elmer | 501/54 |
| 4,749,902 | 6/1988 | Weiss | 313/332 |

FOREIGN PATENT DOCUMENTS

| | | |
|---|---|---|
| 0019327 | 11/1980 | European Pat. Off. . |
| 0032763 | 7/1981 | European Pat. Off. . |
| 203040 | 10/1983 | German Dem. Rep. . |
| WO86/07051 | 12/1986 | WIPO . |

OTHER PUBLICATIONS

Derwent Abstract of JP-A-59-003,042 of Toshiba Ceramics K.K., entitled "IR-absorbing quartz glass transp. to visible light," published 9 Jan. 1984, based on application 82-107, 253 filed 24 Jun. 1982; Derwent accession No. 84-040,297.

*Primary Examiner*—Karl Group
*Assistant Examiner*—David Sample
*Attorney, Agent, or Firm*—Frishauf, Holtz, Goodman, Langer & Chick

[57] ABSTRACT

Soft quartz glass having low viscosity and a low thermal coefficient of expansion, high electrical insulation capability and free from release of contaminants, when used as a bulb of an incandescent lamp or as an envelope in an arc vessel of a discharge lamp, is a quartz glass made of ultra-pure quartz ($SiO_2$), for example having a purity of 99.99 mol-%, doped with stoichiometric compounds of alkaline earth oxides with boron oxide, optionally also with a small quantity of $Al_2O_3$ in an overall quantity of the doping substance of between about 0.05% to 0.8%, by weight.

13 Claims, 4 Drawing Sheets

DOPED QUARTZ GLASS, AND ENCLOSURES FOR ELECTRICAL APPARATUS MADE THEREFOR

This application is a continuation, of application Ser. No. 08/148,822, filed Nov. 4, 1993 now abandoned.

Reference to related patents, the disclosures of which are hereby incorporated by reference, assigned to assignee of the present application:

U.S. Pat. No. 4,508,991, Wurster et al
U.S. Pat. No. 4,749,902, Weiss (the inventor hereof).

Reference to related patent, the disclosure of which is hereby incorporated by reference:

U.S. Pat. No. 4,336,048, van der Steen.

Reference to related disclosures:

German Democratic Republic Patent 203,040, Grabner et al WO 86/07051, Gruenwald et al.

FIELD OF THE INVENTION

The present invention relates to a quartz glass, and more particularly a "soft" quartz glass containing alkaline earth oxides, which is particularly suitable as an envelope for electric lamps of moderate loading or power rating.

BACKGROUND

"Soft" quartz glass has lower viscosity than pure quartz glass. For many applications, the very low coefficient of thermal expansion of quartz glass is desirable, without, however, requiring the characteristics of pure quartz glass, namely that it can accept high thermal loading. High thermal loading is usually associated with high viscosity. The advantage of soft quartz glass is that its shaping and handling during manufacture is simpler and requires less energy than the highly viscous quartz glasses. Usually, the characteristics of soft quartz glass are obtained by mixing ultra-pure quartz glass with small quantities of alkali oxides and alkaline earth oxides. Additional additives of aluminum oxide, $Al_2O_3$, titanium oxide, $TiO_2$, and/or zirconium oxide, $ZrO_2$, may be used, see the referenced U.S. Pat. No. 4,336,048, van der Steen. By carefully controlling the mixture of these components and matching the components in the mixture, a small addition of, for example, less than 0.5 mol-% can be used to obtain a viscosity which is similar to that of the known, substantially higher doped Vycor™ glass. Vycor, besides alkali oxides further contains about 3% of $B_2O_3$, the remainder being silicon dioxide. For high-purity or ultra-purity quartz glass, the starting material should be pure to, or not substantially less pure than, about 99.99 mol-% $SiO_2$.

The known quartz glass has a disadvantage, however, in that the alkali oxides tend to vaporize at the high temperature prevalent in a glass furnace. Thus, as it is handled and worked on, it becomes more viscous, and tougher. Alkali oxide additives also lead to problems in some uses, where particularly high purity is important or the electrical insulation characteristic is important. For example, when making envelopes or vessels for discharge lamps, the plasma in the discharge lamp may be subject to undesired contamination. In highly loaded incandescent lamps, spurious discharges between conductors may occur due to alkali-ion charge carriers.

THE INVENTION

It is an object to provide a quartz glass having low viscosity, but which, still, can be operated on, handled and treated easily and without problems.

Briefly, the quartz glass contains alkaline earth oxides as a doping material and, simultaneously, boron oxide, in an overall quantity of up to about 0.8%, by weight.

The quartz glass in accordance with the present invention uses only a very small proportion of alkali oxides, preferably less than a third of the other doping material. Some glasses need not have any alkali oxides at all. Such quartz glasses, have optimum characteristics when used for lamps.

It has been found, surprisingly, that the critical feature is the combination of alkaline earth oxides and boron oxide. Alkaline earth oxides as well as boron oxide reduce the viscosity of the quartz glass. The advantage of the combination of the two types of oxides is that the boron oxide tends to counteract the increased tendency for crystallization of the quartz glass caused by the alkaline earth oxides.

It is a particular advantage of the present invention that both components can be added as a single compound, that is, in a stoichiometric proportion. Preferably, one or more alkaline earth borates may be used. This prevents the occurrence of excess of free $B_2O_3$. In manufacture, there will be no losses of doping substance due to vaporization of $B_2O_3$, which might lead to an undesired increase of viscosity. The resistance to crystallization of these glasses is similar to that of the known quartz glass.

Borates of calcium, barium, strontium and/or magnesium have been found particularly suitable. An overall doping of up to about 0.8% is preferred. If the quantity is increased, the tendency to crystallization is increased and, therefore, higher quantities are less suitable. The lower level of doping is about 0.05%. Smaller quantities do not provide a sufficient effect of decreasing the viscosity.

The quartz glass can be worked on and handled easier if other doping materials are also added in small quantities, typically about 0.1%. Such other additives are, for example, $Al_2O_3$.

In the specification and claims, all percentages given are by weight, unless otherwise stated.

DRAWINGS

DETAILED DESCRIPTION

A number of examples will be given below in which the specific characteristics of particularly preferred embodiments are also described.

EXAMPLE 1

(FIG. 1)

The quartz glass has 0.25% $BaB_2O_4$, remainder $SiO_2$ with a purity of 99.99%.

The BaB$_2$O$_4$ corresponds to an oxide combination of BaO and B$_2$O$_3$. This glass, full-line curve in FIG. 1, has similar viscosity relationships with respect to temperature as Vycor glass. Vycor is shown in a chain-dotted curve. There is some crystallization in the region between about 1200° C. to 1500° C. This region is rapidly passed in manufacture and consequently is not disadvantageous for the product.

This product can be used as the envelope or bulb for a lamp, which may be an incandescent lamp (FIG. 4) or a discharge lamp (FIG. 5), with temperatures below 1000° C. Tendency of crystallization for several hundred hours in air is suppressed. The coefficient of thermal expansion is 0.6×10$^{-6}$/K.

EXAMPLE 2

(FIG. 1)

The quartz glass has 0.5% BaCaB$_4$O$_8$, the remainder high-purity SiO$_2$.

Figure 1:
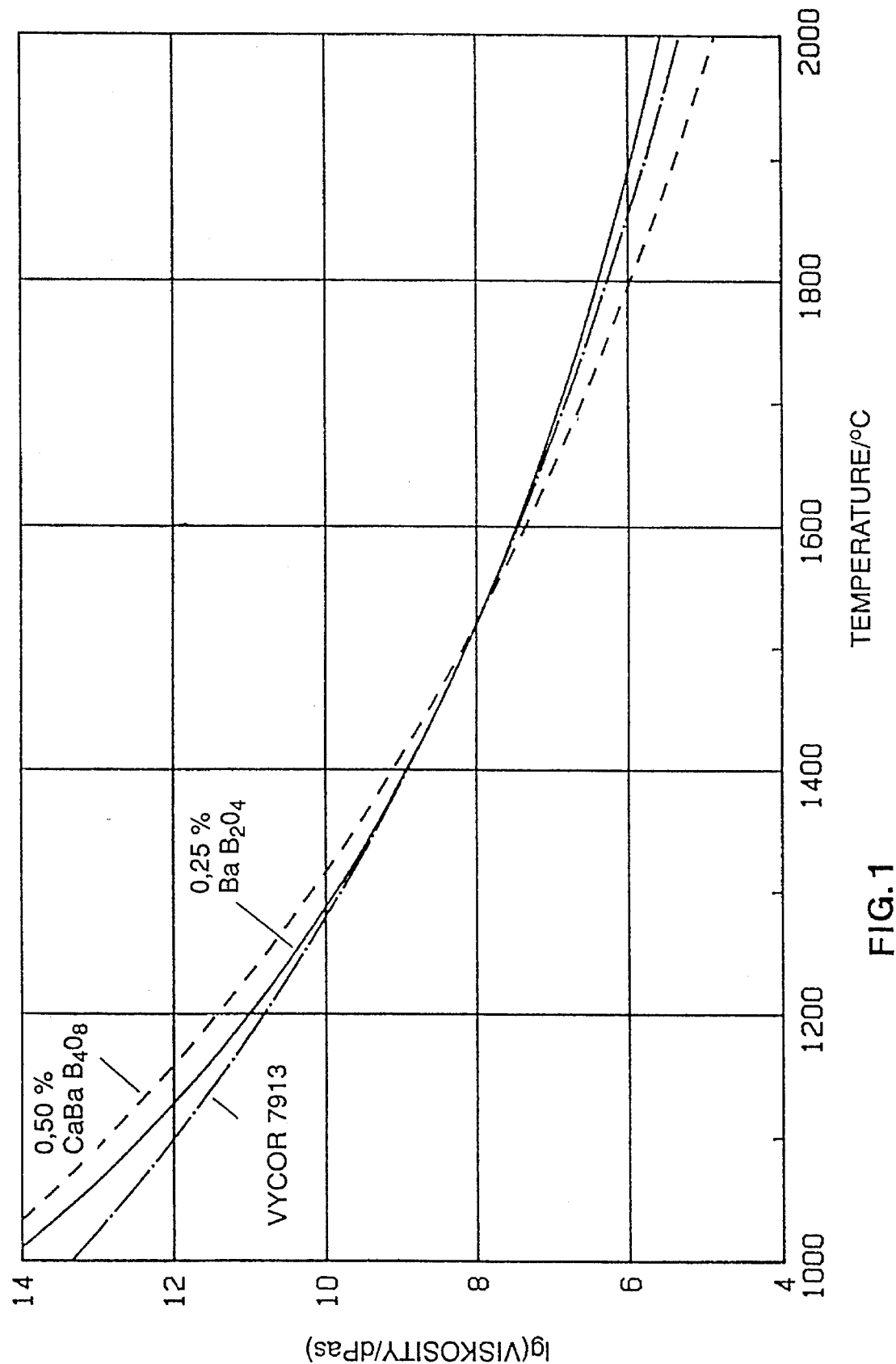
FIG. 1 shows a family of curves of viscosity in which the ordinate represents the decadic logarithm of viscosity, in deciPascal seconds (dPas), and the abscissa represents temperature in ° C. for various glasses, and also for Vycor.
Figure 2:
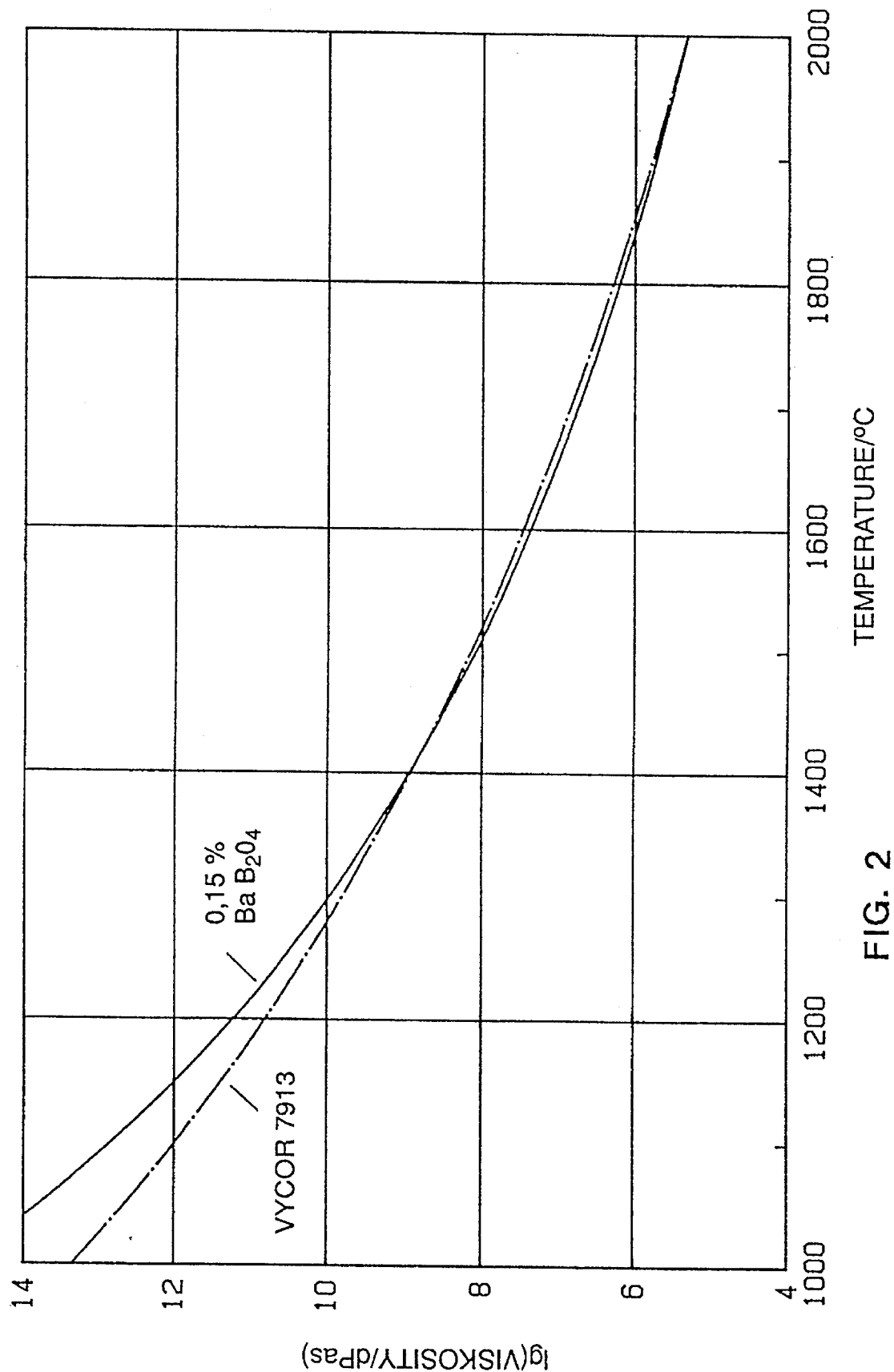
FIG. 2 shows a family of curves similar to FIG. 1, illustrating the relationship with respect to other types of glasses than FIG. 1.

The additive BaCaB$_4$O$_8$ has the oxide construction of BaO×CaO×2B$_2$O$_3$. This glass is somewhat "shorter" and the characteristics are shown in FIG. 1 in the broken-line curve.

EXAMPLE 3

(FIG. 2)

The quartz glass has 0.15% BaB$_2$O$_4$, the remainder high-purity SiO$_2$.

The BaB$_2$O$_4$ is built up of BaO×B$_2$O$_3$. This doping shows a viscosity characteristic just above Vycor, with somewhat higher stress release temperature. A crystallization experiment shows that the glass is subject to only very low devitrification. The tendency of crystallization, thus, is even less than is the case with Vycor.

EXAMPLE 4

Rather than using metaborate (diborate) of barium, as illustrated in Examples 1 and 3, the tetraborate BaB$_4$O$_7$, having the oxide construction BaO×2B$_2$O$_3$ is also suitable.

FURTHER EXAMPLES

Other alkaline earth oxides besides barium borate are also suitable, particularly the metaborates or tetraborates of calcium, strontium, magnesium, and mixed borates thereof, particularly, a mixed borate including barium borate in accordance with Example 2.

Figure 3:
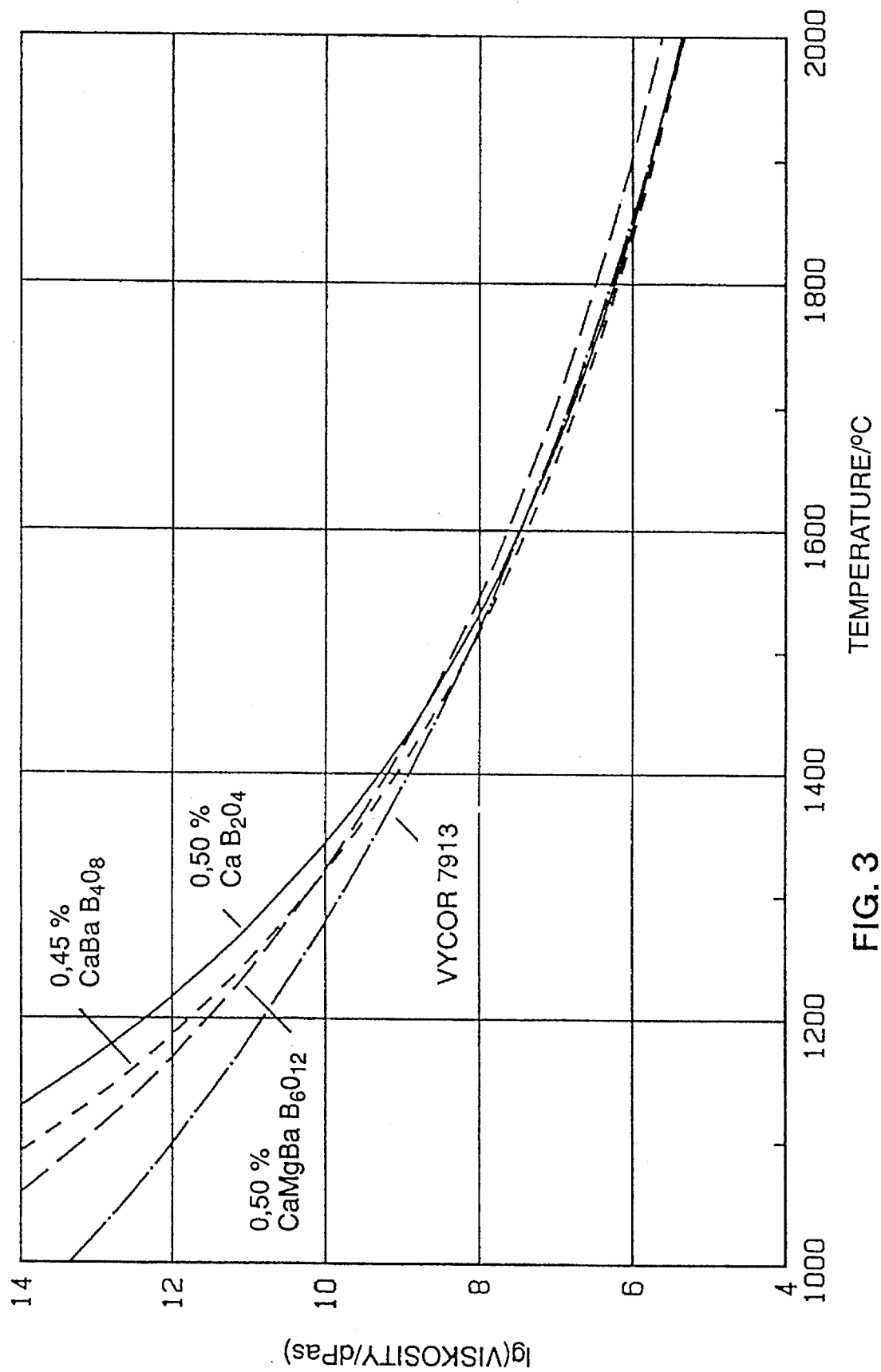
FIG. 3 shows a family of curves similar to FIG. 1, illustrating the relationship to yet other glasses of FIG. 1.

FIG. 3 illustrates the viscosity curves of additional, particularly suitable, doped quartz-glass melts. The doping content of the quartz glass, see FIG. 3, is as follows:

0.50% (CaO×MgO×BaO×3B$_2$O$_3$), long dash, broken line curve 0.45% (CaO×BaO×2B$_2$O$_3$), short dash, broken line curve 0.50% (CaO×B$_2$O$_3$), solid-line curve.

Vycor is shown as a chain-dotted curve.

Additional substances which can be added in small quantities are, for example, Al$_2$O$_3$ and alkali oxides. Alkali oxides should be added, in an overall quantity, which is at the most about one-third of the overall quantity of alkaline earth oxides and boron oxide.

The glasses described herein have been found suitable for maximum temperature use of about 900° C.

The soft quartz glass, preferably, contains stoichiometric compounds of alkaline earth oxides with boron oxide in an overall quantity of up to about 0.8%, so that the resulting glass has 99.2% SiO$_2$. A preferred lower limit is about 0.05% (by weight). Basically, it is possible to use starting materials for the doping which are not borates, but rather the oxides. It is then recommended that the individual quantities be matched together stoichiometrically.

Manufacture of the glass

The manufacture of the glass can be done as well known in the industry, for example as described in U.S. Pat. No. 4,336,048, van der Steen et al. The glasses are molten in a hydrogen/helium atmosphere. IOTA sand is used as the quartz sand, into which the borates can be mixed.

Figure 4:
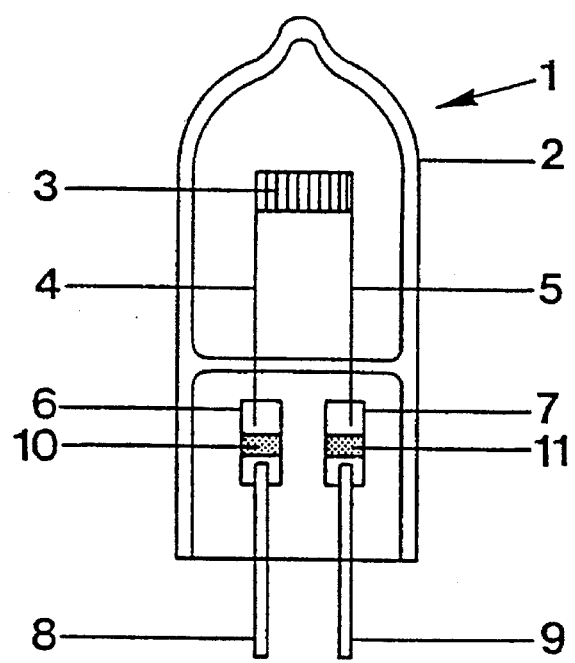
FIG. 4 is a schematic view of a halogen incandescent lamp, in which the glass bulb or envelope uses a glass in accordance with the present invention.

Referring now to FIG. 4:

A single-ended halogen incandescent lamp 1 of high power is shown in which a quartz glass bulb 2 retains a twisted filament 3 which is secured to two inner current supply leads 4, 5. The inner supply leads 4, 5 are connected, for example by welding, to molybdenum foils 6, 7 which, in turn, are connected to outer current supply leads 8, 9 which may also serve as connecting terminals. The filament 3 is made of tungsten; the current supply leads 4, 5 and 8, 9 are made of molybdenum. A pinch or press seal is shown at 2a. A solder glass strip 10, 11 is applied on each of the foils 6, 7 to ensure vacuum tightness.

Figure 5:
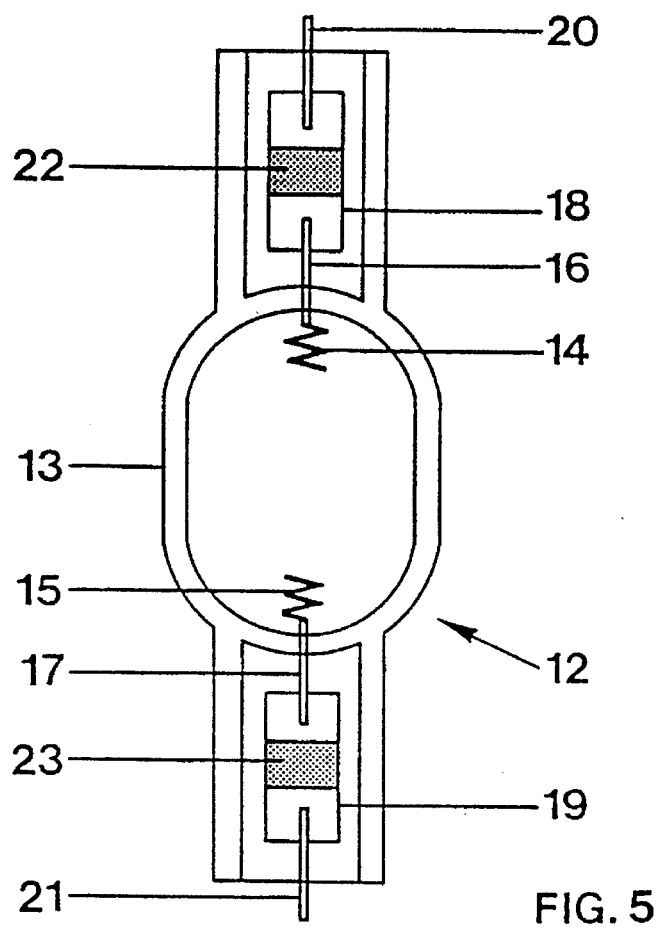
FIG. 5 is a schematic view of a discharge lamp in which the glass of the envelope can be any one of the glasses of the present invention.

FIG. 5 illustrates an embodiment of a double-ended metal halide discharge lamp 12. A quartz glass bulb 13 has two electrodes 14, 15 located therein, which are, respectively, connected to inner current supply leads 16, 17. The current supply leads 16, 17 are connected through the pinch or press seals 13a, 13b by melt connection, in which the foils 18, 19 are placed, the foils being melted-in into the pinch or press seal. The conductive connection between the foils 18, 19 towards the outside is obtained by the two external current supply leads 20, 21.

To ensure tightness of melt seals 13a, 13b, solder glass layers 22, 23 are, respectively, applied across the center portion of the foils 18, 19.

The bulbs or envelopes 2, 13 are made of one of the glasses described heretofore, in accordance with the present invention.

I claim:

1. A quartz glass body consisting essentially of high purity SiO$_2$ and 0.05 to 0.8% by weight of doping substances which consist essentially of alkaline earth oxides and boron oxide, said glass not containing any alkali metal oxides and having a thermal expansion of about 0.6×10$^{-6}$/K.

2. The glass body of claim 1, wherein at least a portion of the doping substance is added to the quartz glass in the form of at least one borate.

3. The glass of claim 2, wherein the doping substances comprise metaborate(s) or tetraborate(s), in stoichiometrically formulated chemical compounds.

4. The glass body of claim 1, wherein the purity of the high-purity SiO$_2$ is 99.99 mol-% SiO$_2$.

5. The glass body of claim 1, wherein the alkaline earth oxides are selected from the group consisting of BaO, SrO, CaO, MgO and mixtures thereof.

6. The glass body of claim 1, wherein said glass body contains at least 99.2% SiO$_2$, the remainder consisting essentially of said doping substances.

7. A quartz glass body consisting essentially of high purity SiO$_2$ and doping substances, wherein the doping substances consist essentially of 0.05 to 0.8% by weight of at least one alkaline earth oxide and boron oxide and less than 0.1% by weight of at least one further doping material, said glass not containing any alkali metal oxides and having a thermal expansion of about 0.6×10$^{-6}$/K.

8. The glass body of claim 7, wherein said further doping material is Al$_2$O$_3$.

9. The glass body of claim 7, wherein at least a portion of the doping substance is added to the quartz glass in the form of a borate.

10. The glass body of claim 7, wherein the doping substances comprise metaborate or tetraborate, in stoichiometrically formulated chemical compounds.

11. The glass body of claim 7, wherein the purity of the high-purity $SiO_2$ is 99.99 mol-% $SiO_2$.

12. The glass body of claim 7, wherein the at least one alkaline earth oxide is selected from the group consisting of BaO, SrO, CaO, MgO and mixtures thereof.

13. The glass body of claim 7, wherein said glass body contains at least 99.2% $SiO_2$, the remainder consisting essentially of said doping substances.

* * * * *